United States Patent [19]
Taglione et al.

[11] Patent Number: 5,966,225
[45] Date of Patent: Oct. 12, 1999

[54] MULTI-CHANNEL OPTICAL TRANSCEIVER

[75] Inventors: John V. Taglione, Scarborough; Brian Richard Ingham, Aurora, both of Canada

[73] Assignee: International Business Machines Corporation, Armonk, N.Y.

[21] Appl. No.: 08/747,310

[22] Filed: Nov. 12, 1996

[30] Foreign Application Priority Data

Dec. 28, 1995 [CA] Canada ................................. 2166255

[51] Int. Cl.$^6$ ................................................ H04B 10/00
[52] U.S. Cl. ...................... 359/152; 359/169; 359/172
[58] Field of Search ................................. 359/143, 152, 359/159, 169, 170, 172, 113

[56] References Cited

U.S. PATENT DOCUMENTS

| | | | |
|---|---|---|---|
| 5,278,687 | 1/1994 | Jennson et al. | 359/124 |
| 5,416,624 | 5/1995 | Karstensen | 359/152 |
| 5,774,247 | 6/1998 | Taglione et al. | 359/152 |

*Primary Examiner*—Edward Lefkowitz
*Attorney, Agent, or Firm*—John D. Flynn

[57] ABSTRACT

A data transceiver employing optical radiation comprises transmitter assembly with an optical emitter operable in a first band and an optical emitter in a second band and a receiver assembly with a wide band optical detector which can receive signals transmitted via both the first and second band. In a second embodiment, the receiver includes both a wide band optical detector and a second optical detector which is operable in only one of the first and second bands, the receiver subtracting signals received at the second optical detector from those received at the wide band detector to separate signals received via the first and second bands. In a preferred aspect, the optical radiation employed is infrared radiation and the first and second bands are near and medium infrared bands.

13 Claims, 5 Drawing Sheets

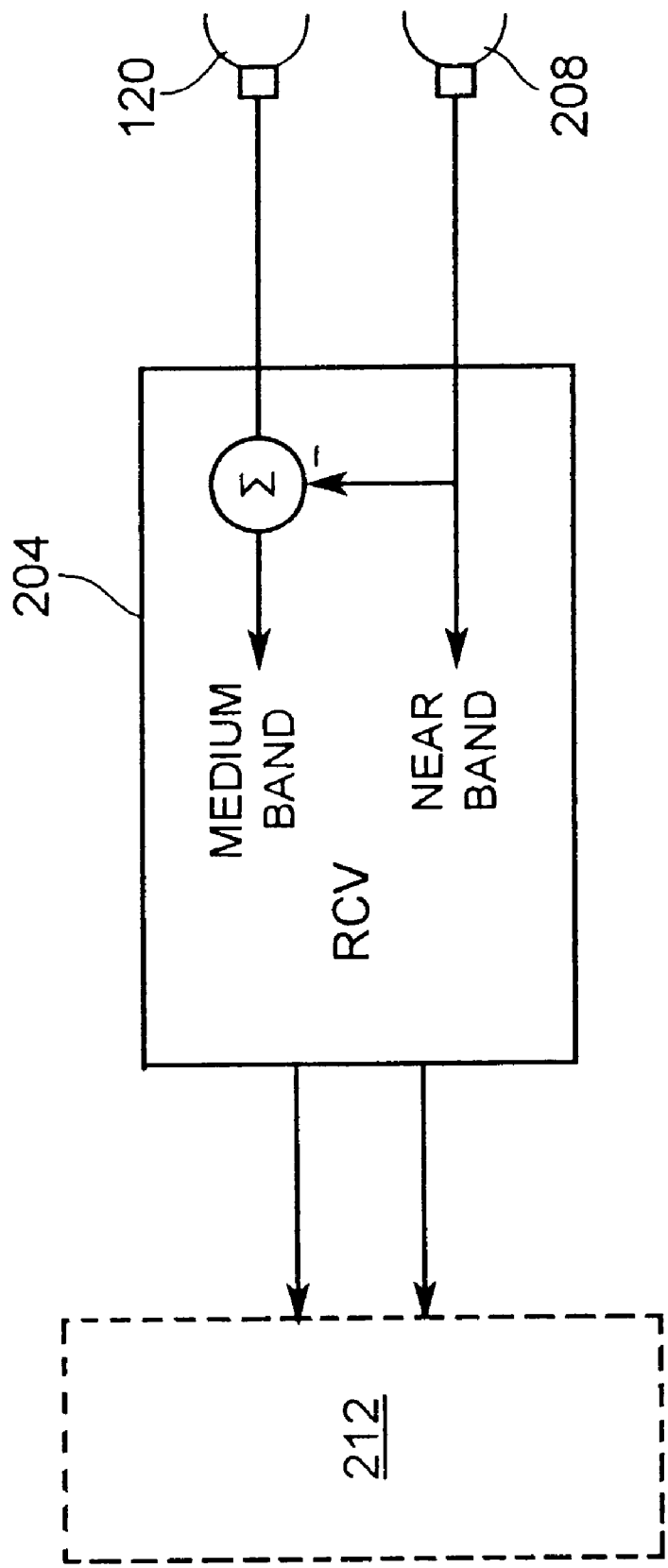

MULTI-CHANNEL OPTICAL TRANSCEIVER

FIELD OF THE INVENTION

The present invention relates to optical transceivers. More specifically, the present invention relates to optical transceivers for data transmissions.

BACKGROUND OF THE INVENTION

Optical data communications have recently become quite popular. Prior art optical data communication systems have commonly been based upon infrared (IR) wavelengths and comprise a range of systems from one way links, such as links from calculators to printers, to simple systems to replace the keyboard cable on a personal computer, to high bit rate systems used to construct wireless local areas networks (LANs).

While IR based optical data communications systems have many advantages over radio or cable-based systems, they also suffer from problems not experienced by such systems. Specifically, as most modern IR systems rely upon semiconductor IR emitters and detectors which have a limited IR spectral response, it is becoming increasingly common that IR devices experience conflicts with other IR devices operating at similar IR wavelengths.

SUMMARY OF THE INVENTION

It is an object of the present invention to provide a novel optical transceiver which obviates or mitigates at least one of the disadvantages of the prior art.

According to a first aspect of the present invention, there is provided an optical data transceiver comprising: a first optical emitter having a first nominal spectral response; a second optical emitter having a second nominal spectral response which does not overlie said first nominal spectral response; a first optical detector having a nominal spectral response incorporating both of said first and second nominal spectral responses; selection means to select at least one of said first and second optical emitters; a transmitter assembly operable with said selected at least one of said first and second optical emitters to transmit data via optical radiation; and a receiver assembly operable to convert data transmissions received by said first optical detector to a corresponding electronic signal in a predefined electronic format.

Preferably, the optical radiation is infrared radiation. More preferably, the first nominal spectral response is between about 850 nm to about 950 nm. Also preferably, the second nominal spectral response is from about 1300 nm to about 1500 nm. Also preferably, the nominal spectral response of the first optical detector is between about 850 nm to about 1500 nm.

In another preferred embodiment, the transceiver further includes a second optical detector with a nominal spectral response substantially the same as the first nominal spectral response and wherein the receiver assembly is responsive to at least one of a first signal received by the first optical detector and a second signal obtained by subtracting any signal received by the second optical detector from a signal received by the first optical detector.

According to another aspect of the present invention, there is provided an infrared data transceiver comprising: a first IR emitter having a first nominal spectral response; a second IR emitter having a second nominal spectral response which does not overlie said first nominal spectral response; a first IR detector having a nominal spectral response incorporating both of said first and second nominal spectral responses; a second IR detector having substantially the same nominal spectral response as said first nominal spectral response; selection means to select at least one of said first and second IR emitters; a transmitter assembly operable with said selected at least one of said first and second IR emitters to transmit data via IR radiation; and a receiver assembly operable to convert data transmissions received by said first IR detector to a corresponding electronic signal in a predefined format and operable to convert a signal obtained by subtracting any signal received by said second IR detector from a signal received by said first IR detector to a corresponding electronic signal in a predefined format.

BRIEF DESCRIPTION OF THE DRAWINGS

Preferred embodiments of the present invention will now be described, by way of example only, with reference to the attached Figures, wherein:

FIG. 5 shows schematically, the signal processing to separate near band and medium band signals in the receiver assembly of the IR transceiver of FIG. 4.

DETAILED DESCRIPTION OF THE INVENTION

Figure 1:
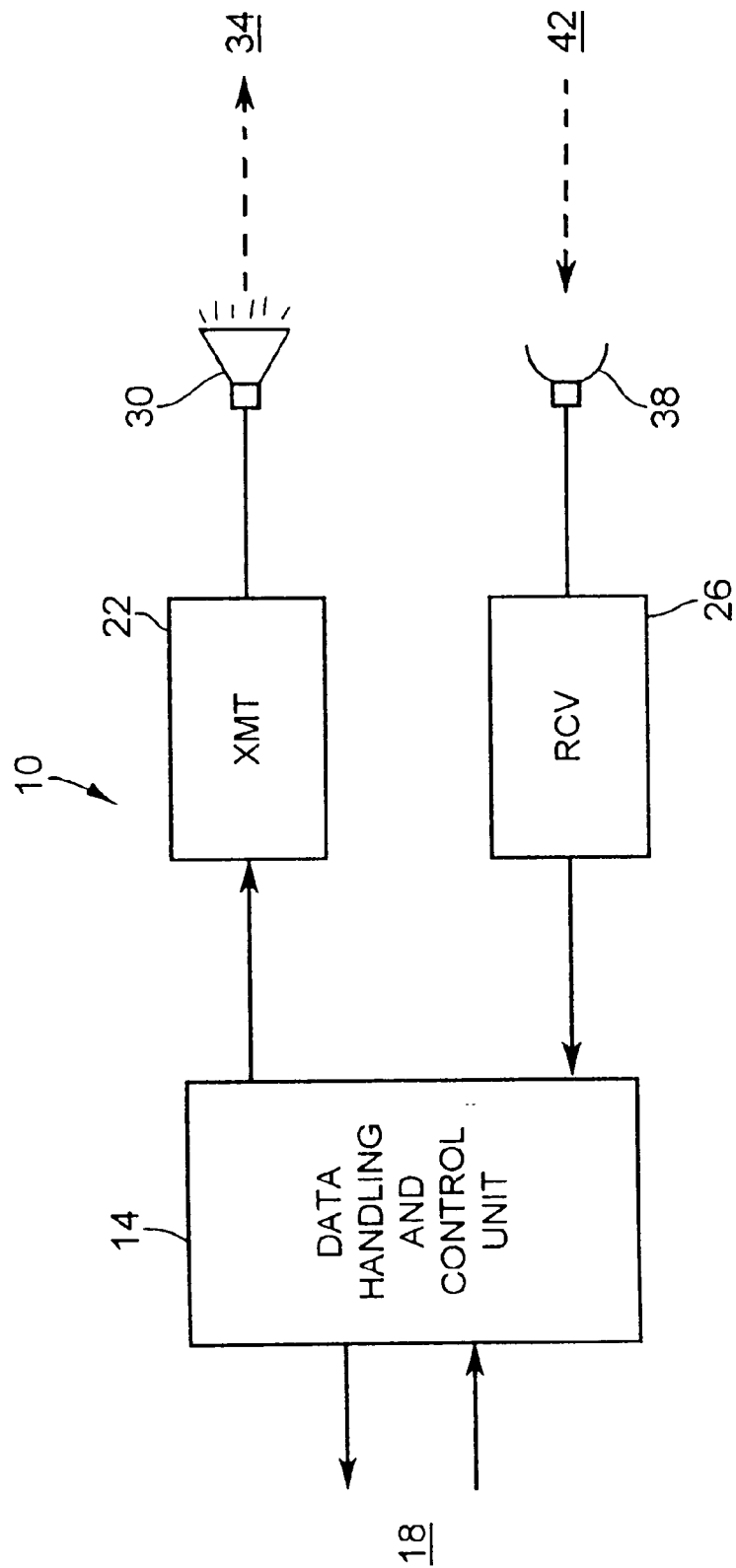
FIG. 1 shows a block diagram of a prior art IR transceiver.

A prior art IR transceiver system is indicated generally at 10 in FIG. 1. Such transceivers generally include a data handling and control unit 14 which connects to a data connection 18 and which provides buffering, protocol conversion and control functions as necessary. Data connection 18 can be a token ring or ethernet LAN, a computer or computer peripheral or any other data source or sink.

Data handling and control unit 14 is also connected to a transmitter assembly 22 and a receiver assembly 26. Transmitter assembly 22 receives data to be transmitted from data connection 18, via data handling and control unit 14, and converts it into the necessary modulated electronic signals which are applied to an IR emitter 30. IR emitter 30 thus emits modulated IR radiation 34 representing the data to be transmitted.

Receiver assembly 26 receives electronic signals from an IR detector 38, these signals representing the IR data transmissions 42 received at IR detector 38. The electronic signals are amplified, demodulated and forwarded to data handling and control unit 14 which appropriately forwarded to data connection 18 via data handling and control unit 14.

Transceiver 10 is employed in systems such as the IBM Infrared Wireless LAN® products sold by IBM which allow for a wireless connection between personal computers and local area networks. In systems such as the IBM Infrared Wireless LAND, the IR Emitter 30 and Detector 38 are arranged to transmit and receive relatively high power (approximately 500 mW) yet diffuse signals to and from a variety of devices.

A more recent use for IR transceivers is with systems constructed for the IRDA (Infrared Data Association) standard. Such systems are used for point to point data transmissions, such as wireless replacements for keyboard cables, etc. and employ relatively directional, and relatively low power (approximately 40 mW) IR detectors and emitters.

Prior art IBM Infrared Wireless LAN® and similar IR LAN products have a coexistence problem with IRDA products in that they both use the same near infrared band of between about 850 nm to about 950 nm. The coexistence problem manifests itself in two forms, the first being that the relatively high power, very diffuse IR LAN transmissions generally overwhelm any signal IRDA signal in their vicinity and the second being that IR LAN transceivers often will not detect the lower powered transmissions of a distant IRDA device. This latter occurrence can lead to problems because IR LAN devices employ CSMA-CA (Carrier Sense Multiple Access-Collision Avoidance) transmission protocols.

Specifically, an IRDA device can be located close enough to an IR LAN device to interfere with the ability of the IR LAN device to receive signals but yet be spaced far enough from another IR LAN device that the distant IR LAN device will not receive the transmissions of the IRDA device. In such a circumstance, the benefits of the CSMA-CA transmission protocol will be lost as the distant IR LAN device will not detect the transmissions of the IRDA device and will thus transmit messages which the close IR LAN device will not properly receive due to the local interference of the transmissions from the IRDA device. As IRDA devices become much more commonplace, this problem will grow.

Presently, IRDA and IR LAN products use the near infrared band (about 850 nm to about 950 nm) for communications. This band is the nominal spectral range of gallium arsenide (GaAS) and gallium aluminum arsenide (GaAlAs) infrared LEDs which are therefore often used as IR emitters in these products.

IRDa and IR LAN products generally use silicon PIN diodes (diodes with an intrinsic high field layer between the p-doped and n-doped regions) as IR detectors and these devices have a nominal spectral response of between about 750 nm to about 1150 nm.

Figure 2:
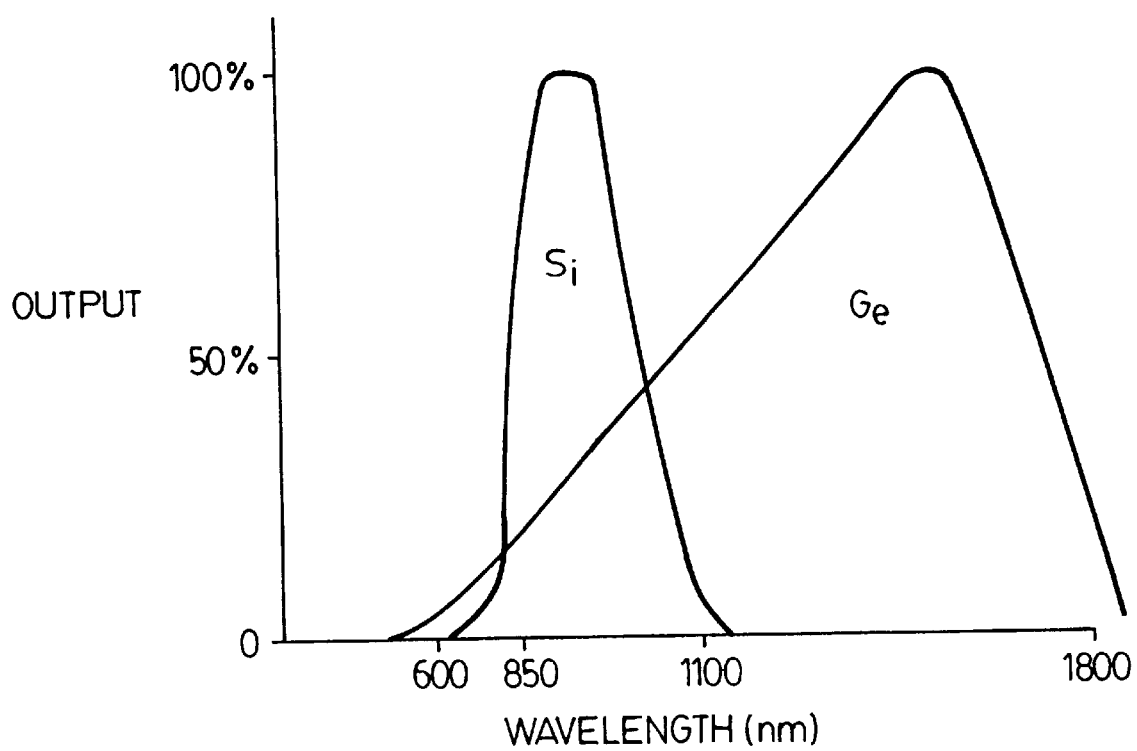
FIG. 2 shows the relative nominal spectral response of a silicon PIN diode IR detector and a germanium PIN diode IR detector.

Another device which can be employed as an IR detector is the germanium PIN diode and this device has a wider nominal spectral response, extending from near infrared (about 600 nm) to medium infrared (about 1800 nm) bands. FIG. 2 shows an example of the respective nominal spectral responses of IR detectors employing silicon and germanium PIN diodes.

Figure 3:
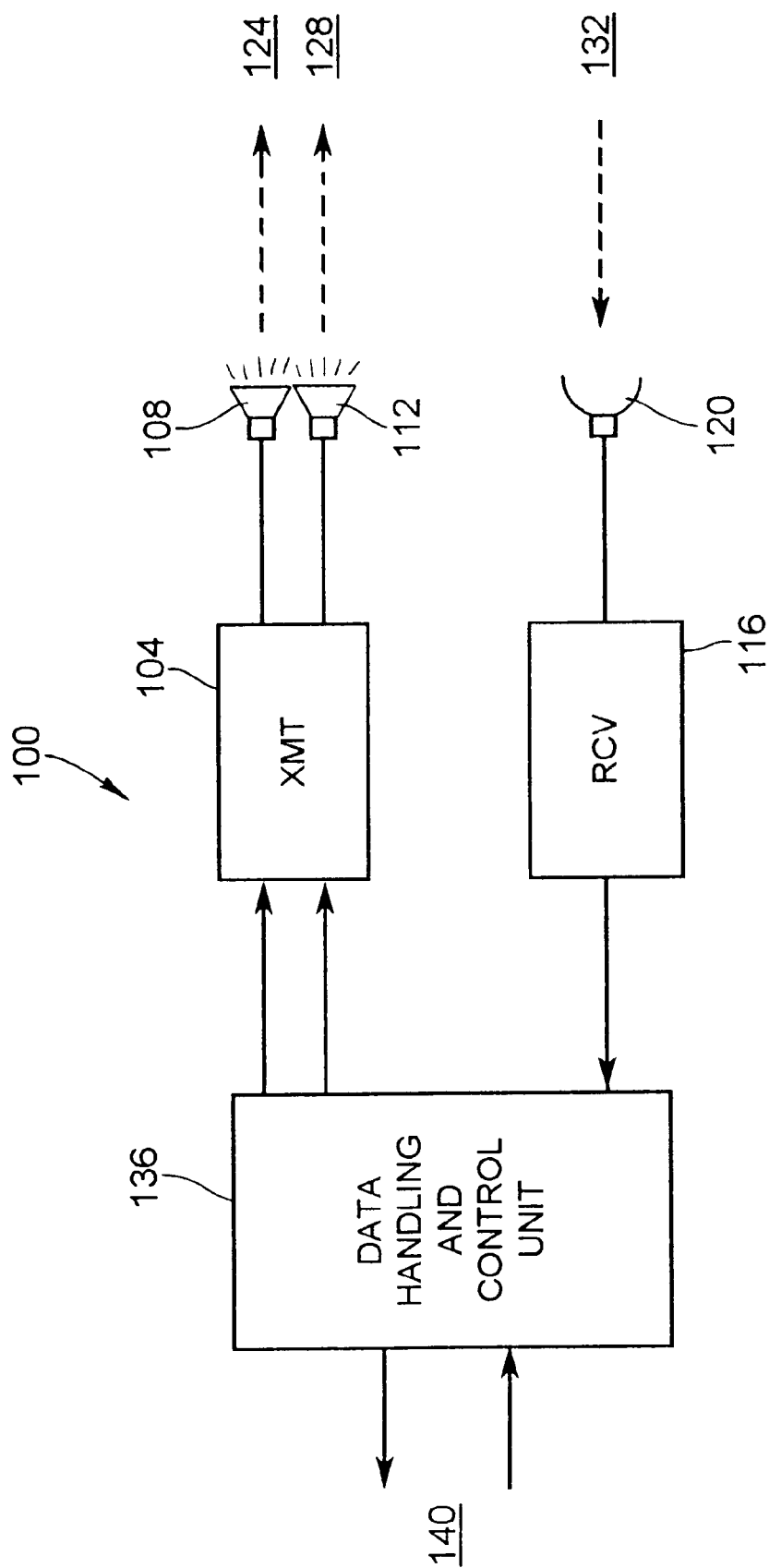
FIG. 3 shows an IR transceiver in accordance with an embodiment of the present invention.

FIG. 3 shows an embodiment of a data transceiver 100 in accordance with the present invention wherein data transceiver 100 can operate as both a near band IR and a medium band IR transceiver. Specifically, transmitter assembly 104 includes a medium band IR emitter 108 and a near IR band emitter 112. Medium band IR emitter 108 is based upon an indium gallium arsenide phosphorous (InGaAsP) LED or a laser diode which has a nominal spectral response of about 1300 nm to about 1500 nm and generally will be arranged to provide a diffuse, relatively high power (about 500 mW) transmission. In one embodiment which is intended to provide compliance with the IRDA standard, near band IR emitter 112 is based upon GaAs or GaAlAs LEDs as used in prior art IR LAN and IRDA devices and will generally be arranged to provide a diffuse, relatively low power (about 40 mW) transmission. As will be apparent to those of skill in the art, if compliance with the transmission power levels of the IRDA standard is not desired, or if a different optical communication standard is to be used, near band IR emitter 112 can broadcast at higher power levels and/or can be arranged to employ directed transmissions.

Receiver assembly 116 employs a wide band IR detector 120, based upon a germanium PIN diode, which detects IR in the range from between about 600 nm to about 1800 nm.

When transceiver 100 is to be used as an IR LAN unit, transmitter assembly 104 will employ medium band IR emitter 108 to transmit data 124 in the medium IR band. In this configuration, IRDA devices in the vicinity of transceiver 100 will not be affected by data 124 transmitted over the medium IR band. When transceiver 100 is to be used as an IRDA unit, transmitter assembly 104 will employ near band IR emitter 112 to transmit data 128 in the near IR band. In both cases, receiver assembly 116 will employ IR detector 120 to receive transmitted signals 132 whether transmitted via near band or medium band IR.

In addition to the necessary buffering, protocol conversion and control functions, in the embodiment of the present invention shown in FIG. 3, data handling and control unit 136 also controls the operating band of transmitter assembly 104. Specifically, data handling and control unit 136 controls transmitter assembly 104 such that near band or medium band IR transmission may be specified for transmission of data. In one contemplated embodiment, data handling and control unit 136 has two address spaces to data connection 140, one address space for transmissions via the medium IR band and the other address space for transmissions via the near IR band.

In a preferred embodiment, transmitter assembly 104 is capable of substantially simultaneously transmitting two data sets, one data set on near band IR via emitter 112 and the other data set on medium band via IR emitter 108. In such an embodiment, data handling and control unit 136 provides the necessary buffering of each data set and related control functions.

This embodiment offers several advantages in that two separate data sets may be sent, data transmission speed may be doubled by dividing it between the available bands, or it may be used for synchronous transmissions. In this latter example, the clock information will be transmitted via one of near band emitter 112 and medium band emitter 108 and the data being transmitted by the other emitter.

Figure 4:
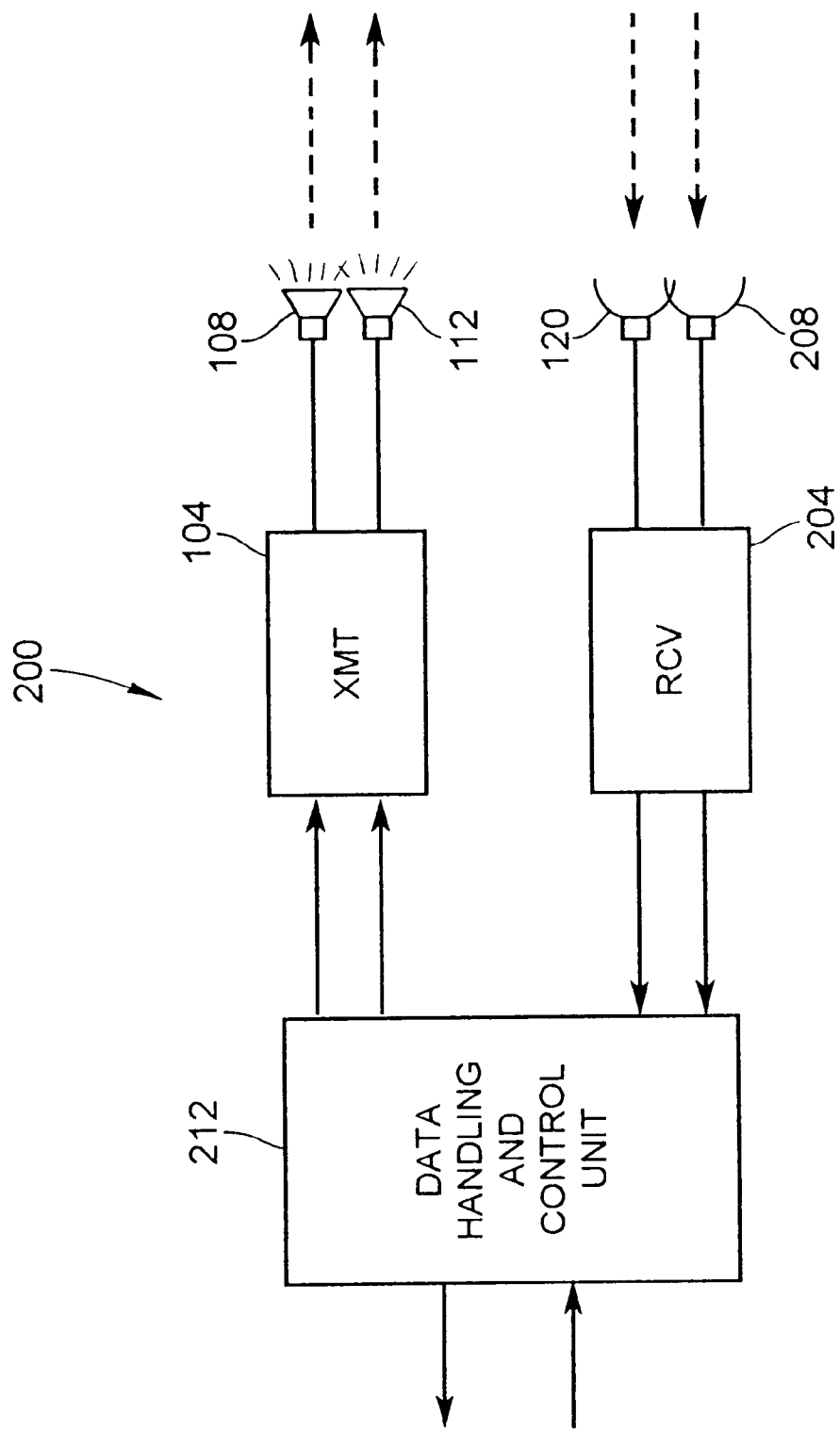
FIG. 4 shows an IR transceiver in accordance with another embodiment of the present invention.

FIG. 4 shows a data transceiver 200 constructed in accordance with another preferred embodiment of the present invention. In this Figure, components which are similar to those described with reference to FIG. 3 have been numbered with like reference numerals. Transceiver 200 includes a transmitter assembly 104 with a medium band IR emitter 108 and a near band IR emitter 112. Receiver unit 204 includes a wide band IR detector 120 and a near band IR detector 208, based upon an silicon PIN diode.

As indicated schematically in FIG. 5, receiver assembly 204 operates to separate those signals received via near band IR transmission from those received via medium band IR transmission. Specifically, signals received by near band IR detector 208 are processed normally and forwarded to data handling and control unit 212 as signals transmitted via near band IR. Signals received by wide band IR detector 120 are processed by subtracting any signal received at near band IR detector 208 to obtain those signals transmitted via medium band IR. To achieve the desired results of the above-described subtraction, wide band IR detector 120 and near band IR detector 208 will be calibrated and normalized such that the near band signals received by each are properly subtractable. Techniques to accomplish such normalization and calibration are well known and will not be further discussed herein.

As will be apparent to those of skill in the art, under this processing strategy, a near band signal received at both of detectors 120 and 208 will be cancelled by the subtraction operation and thus receiver assembly 204 will only forward the signal received at near band detector 208. Similarly, a medium band signal received at wide band receiver 120 will be unchanged by the subtraction operation and receiver assembly 204 will forward the medium band signal to data handling and control unit 212. In the event that both near band and medium band signals are received, receiver assembly 204 forwards the near band signal from near band detector 208 as before and the medium band signal is separated from the mixed medium and near band signals received at wide band detector 120 by the subtraction operation. The resulting medium band signal is also forwarded to data handling and control unit 212 by receiver assembly 204.

Thus, in the embodiment shown in FIGS. 4 and 5, data transceiver 200 can transmit and receive signals on both near and medium band IR substantially simultaneously. Further, implementation of CSMA-CA transmission protocols is enhanced as the protocol can be implemented separately for each IR band. As will be apparent, in addition to the advantages such as doubled speed and synchronous transmissions discussed above with respect to the embodiment of FIG. 3, this embodiment also provides for full duplex transmissions between transceivers 200.

The present invention provides for an improved data transceiver employing optical transmissions. The above-described embodiments of the invention are intended to be examples of the present invention and alterations and modifications may be effected thereto, by those of skill in the art, without departing from the scope of the invention which is defined solely by the claims appended hereto.

What is claimed is:

1. An infrared data transceiver comprising:
    a first IR emitter having a nominal spectral response of between about 850 nm to about 950 nm;
    a second IR emitter having a nominal spectral response of between about 1300 nm to about 1500 nm;
    a first IR detector having a nominal spectral response of between about 850 nm to about 1500 nm;
    selection means to select at least one of said first and second IR emitters;
    a transmitter assembly operable with said selected at least one of said first and second IR emitters to transmit data via IR radiation; and
    a receiver assembly operable to convert data transmissions received by said first IR detector to a corresponding electronic signal in a predefined electronic format.

2. An infrared data transceiver according to claim 1 which employs CSMA-CA transmission protocols wherein said receiver assembly and said IR detector are further operable to detect a carrier.

3. An infrared data transceiver according to claim I further including a second IR detector, said second IR detector having a nominal spectral response of between about 850 nm to about 950 nm and wherein said receiver assembly is responsive to at least one of a first signal received by said first IR detector and a second signal obtained by subtracting any signal received by said second IR detector from a signal received by said first IR detector.

4. An infrared data transceiver according to claim 3 further wherein said selection means also selects at least one of said first and second signals for conversion by said receiver assembly.

5. An infrared data transceiver according to claim 3 which employs CSMA-CA transmission protocols for each of said first nominal spectral response and said second nominal spectral response, said receiver assembly operating to detect a carrier received at either said first IR detector or said second IR detector and a carrier received at said second IR detector.

6. An optical data transceiver comprising:
    a first optical emitter having a first nominal spectral response;
    a second optical emitter having a second nominal spectral response which does not overlie said first nominal spectral response;
    a first optical detector having a nominal spectral response incorporating both of said first and second nominal spectral responses;
    selection means to select at least one of said first and second optical emitters;
    a transmitter assembly operable with said selected at least one of said first and second optical emitters to transmit data via optical radiation; and
    a receiver assembly operable to convert data transmissions received by said first optical detector to a corresponding electronic signal in a predefined electronic format.

7. An optical transceiver according to claim 6 further including a second optical detector, said second optical detector having substantially the same nominal spectral response as said first spectral response and wherein said receiver assembly is responsive to at least one of a first signal received by said first optical detector and a second signal obtained by subtracting any signal received by said second optical detector from a signal received by said first optical detector.

8. An optical data transceiver according to claim 7 which employs CSMA-CA transmission protocols for each of said first nominal spectral response and said second nominal spectral response, said receiver assembly operating to detect a carrier received at either said first optical detector or said second optical detector and a carrier received at said second optical detector.

9. A data transceiver employing optical radiation to transmit and receive data, comprising:
    a first optical radiation emitter having a first spectral response;
    a second optical radiation emitter having a second spectral response separate from said first spectral response;
    a first optical radiation detector having a spectral response incorporating both of said first spectral response and said second spectral response;
    selection means to select at least one of said first and second optical radiation emitters;
    a transmitter assembly operable with said selected at least one of said first and second optical radiation emitters to transmit data via optical radiation; and a receiver assembly operable to convert data transmissions received by said first optical detector to a corresponding electronic signal in a predefined electronic format.

10. A data transceiver according to claim 9 further including a second optical radiation detector, said second optical radiation detector having substantially the same nominal spectral response as said first spectral response and wherein said receiver assembly is responsive to at least one of a first signal received by said first optical radiation detector and a second signal obtained by subtracting any signal received by said second optical radiation detector from a signal received by said first optical radiation detector.

11. A data transceiver according to claim 10 wherein said optical radiation is infrared radiation.

12. A data transceiver according to claim 11 wherein said first spectral response is between about 850 nm to about 950 nm and said second spectral response is between about 1300 nm to about 1500 nm.

13. A data transceiver according to claim 12 wherein said data transceiver operates in a full duplex mode.

* * * * *